United States Patent

Moultrie

[15] 3,659,927
[45] May 2, 1972

[54] REAR VIEW OPTICAL TRAIN AND DOVE PRISM

[72] Inventor: Charles W. Moultrie, 1543 East 85th Street, Chicago, Ill. 60619

[22] Filed: Apr. 1, 1970

[21] Appl. No.: 24,486

[52] U.S. Cl.................................350/286, 350/302, 350/307
[51] Int. Cl..........................................................G02b 5/04
[58] Field of Search..................350/178, 179, 286, 287, 301, 350/307; 356/134

[56] References Cited

UNITED STATES PATENTS

| | | | |
|---|---|---|---|
| 2,757,575 | 8/1956 | Kovach | 350/287 |
| 3,489,486 | 1/1970 | De LaCierva | 350/287 |
| 3,165,573 | 1/1965 | Moultrie | 350/307 |
| 2,443,390 | 6/1948 | Kingston | 350/178 |
| 2,399,676 | 5/1946 | Holschuh | 350/301 |

*Primary Examiner*—David Schonberg
*Assistant Examiner*—Michael J. Tokar
*Attorney*—Sherman, Meroni, Gross & Simpson

[57] ABSTRACT

Dove prism particularly adapted for the optical trains of rear view vision devices. The prism is relatively large, to provide an adequate image in a rear view vision optical train and is in the form of an isosceles triangular prism filled with optical liquid. A prismatic frame forms a support for two transparent refractory plates of equal length and extending at equal angles with respect to the base of the prismatic frame. A mirror extends along the base between the transparent plates. The sides of the prismatic frame are opaque, to prevent beams of light from entering the prism. The optical liquid may be a distilled water containing alcohol or any other clear anti-freeze which will not settle out of the liquid or change color upon changes in temperature. The plates of the prism, refract beams of light to the mirror and in turn project the beams of light to a lens or mirror for viewing through a screen, which may be in the form of a ground glass screen.

11 Claims, 6 Drawing Figures

Patented May 2, 1972 3,659,927
2 Sheets-Sheet 1
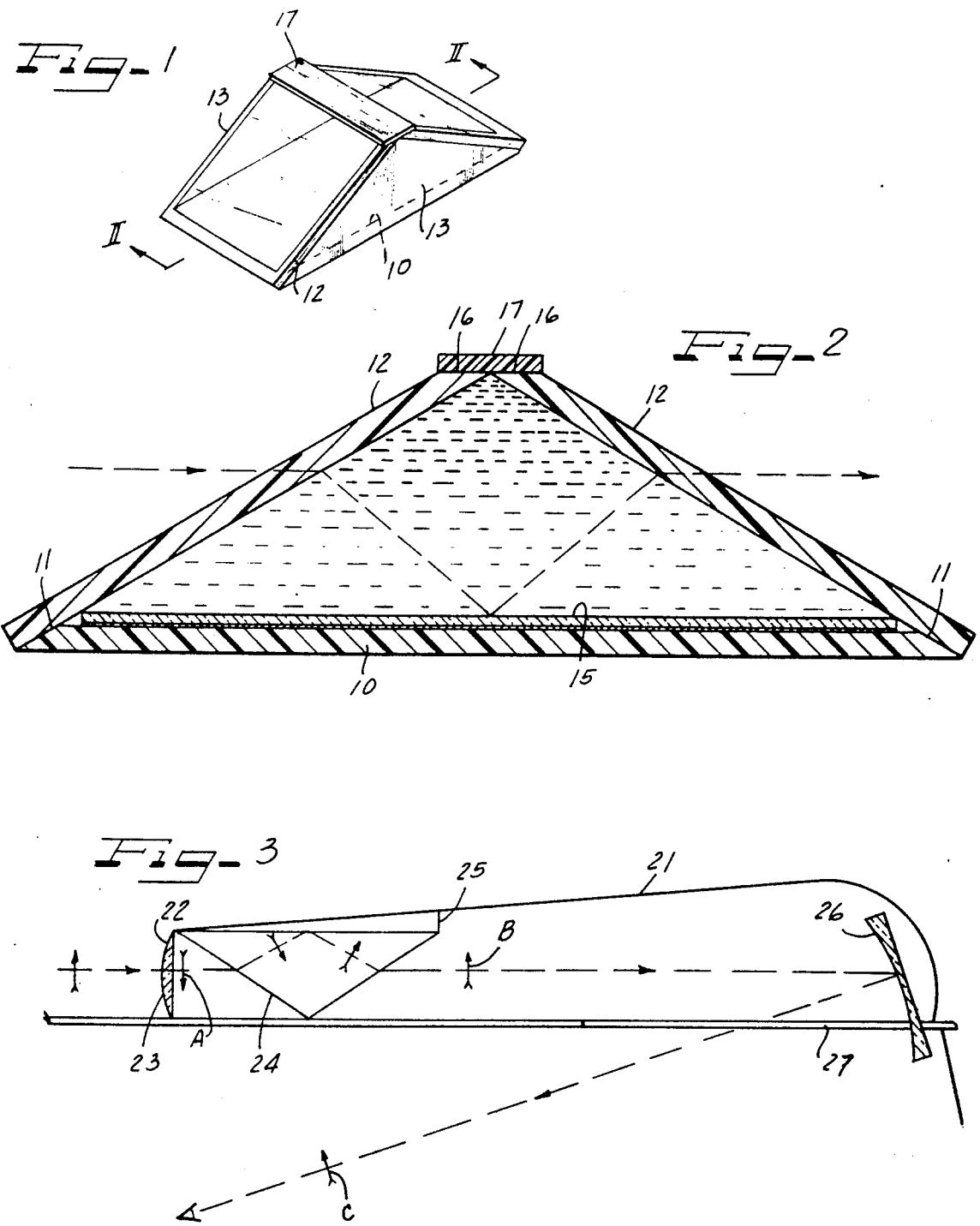
INVENTOR.
CHARLES W. MOULTRIE
BY
ATTORNEYS Patented May 2, 1972

INVENTOR.
CHARLES W. MOULTRIE

BY _____ ATTORNEYS

3,659,927

REAR VIEW OPTICAL TRAIN AND DOVE PRISM

BACKGROUND AND OBJECTS OF INVENTION

In optical trains which have been proposed and used on rear vision devices for automotive vehicles, aircraft and the like, it has been known that a marked improvement in the vision may be had by the use of a dove prism reflecting and projecting the image as refracted by one angular face of the prism and projected by the other angular face of the prism. Such prisms, however, in order to operate satisfactorily without a series of magnifying lenses, must be of a relatively large size, to refract an entire image of sufficient expanse to provide a full rear view behind the vehicle. The cost of such prisms, however, is relatively high making it uneconomical to use such prisms in automotive vehicle rear vision optical trains.

By the present invention I provide a composite prism utilizing angular glass plates arranged in the form of an isosceles triangle and having a mirror extending along the base of the prism between the glass plates with opaque sides of the prism supporting the plates. The prism is then filled with a colorless optical liquid, such as distilled water containing a colorless anti-freeze which will not separate out of the water, and which remains transparent over long periods of time.

While liquid film prisms are known, and prisms containing colorless liquids are also known, the improvement of the present invention is to make practical a prism for use in rear vision optical trains employing transparent refracting surfaces placed at the required angles with respect to the base of the triangle, and to increase the transmission ability of the prism by providing a horizontal reflective surface extending along the base of the triangle between the refracting surfaces, to provide a total image transmitter, inverter and vertical rectifier, in which the image may be transmitted by a lens or may be directly viewed.

A principal object of the present invention, therefore, is to provide an economical dove prism which may be efficiently used in rear vision optical trains, by utilizing a hollow prism having refracting surfaces placed at predetermined angles relative to the base of the prism and having a mirror extending along the base of the prism and filled with a colorless nonfreezable liquid.

A still further object of the invention is to improve upon the efficiency and economy of dove prisms heretofore known by providing a prismatic frame including a base and opaque sides, and placing a mirror along the base, and utilizing refractive plates converging toward each other from the ends of the mirror at equal angles relative to the surface of the mirror, in which the space between the refractive plates, mirror and opaque sides is filled with a colorless optical liquid.

A still further object of the invention is to provide a novel and inexpensive form of dove prism which may be used as a total image transmitter, inverter and vertical rectifier in a rear vision optical train, in which the base of the prism has a mirror extending therealong and the angular sides of the prism are in the form of converging refractory plates extending at equal angles with respect to the mirror and containing a clear optical liquid within the prism.

A still further object of the invention is to make practical a periscope type of rear view vision device by utilizing an optical liquid filled dove prism as a total energy transmitter in the optical train of the device.

Other objects, features and advantages of the invention will be readily apparent from the following description of a certain preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a diagrammatic perspective view of a dove prism constructed in accordance with the principles of the present invention.

FIG. 2 is a longitudinal sectional view taken through the prism substantially along line II—II of FIG. 1.

FIG. 3 is a diagrammatic view schematically showing an optical rear vision train in a housing extending along the top of an automotive vehicle in order to illustrate one form in which the prism may be used in an optical train.

DESCRIPTION OF PREFERRED EMBODIMENT OF INVENTION

Figure 4:
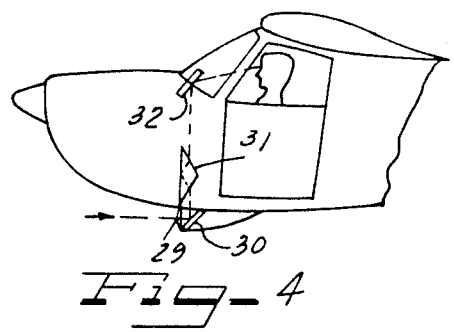
FIG. 4 is a diagrammatic view schematically showing a periscope type of rear view vision device for use in an airplane, and showing a dove prism in cooperation with a series of mirrors and lenses for transmitting a total image from in front of the aircraft.

In FIGS. 1 and 2 of the drawings, I have shown a liquid filled dove prism constructed in accordance with the principles of the present invention including a prismatic frame having a base 10. The base 10 has inclined end walls 11, 11 at the same angles of inclination relative to the plane of the base and adapted to be abutted by and sealed to transparent plate 12,12 forming the refractive faces of the prism. The plates 12,12 may be made from glass free from imperfections, such as a quartz glass, of from a clear plastic having an index of refraction closely approximating the index of refraction of quartz glass. The prismatic frame also includes a pair of parallel spaced side walls 13,13 extending along each side of the base 10 and suitably sealed thereto. The side walls 13,13 are preferably opaque and are generally in the form of isosceles triangles, the bases of which are parallel to the plane of the base 10, and the two sides of which are inclined at the angles of the inclined ends 11,11 of the base 10 and forming laterally outward and upward continuations thereof.

Prior to assembling the plates 12,12 to the base 10 and side walls 11, a mirror 15 is placed on the top surface of the base 10 and suitably sealed thereto. The mirror 15 may be of such a length as to engage the insides of the refractory plates 12,12 of the prism, to provide a reflecting surface facing the plates 12,12 and extending for the length of the prism.

As shown in FIG. 1, the plates 12,12 extend along and are suitably secured to the inclined edges of the side walls 13,13 and have upper surfaces 16,16 inclined relative to the planes of said plates and extending generally horizontally along the tops of the side walls 13,13 in registry with the apicies thereof. A closure plate 17 is provided to close the space between the adjacent ends of the plates 12,12 and to seal an optical liquid thereto.

In assembling the device, assuming the mirror 15 is sealed to the top surface of the base 10. The side walls 13,13 are secured to opposite sides of the base and may extend therealong to the bottom of the base. Said side walls may be secured to the base, as by screws or other securing means (not shown) and may also be cemented to the base to provide a liquid-tight seal between the side walls and the base. The transparent refractory plates 12,12 may then be assembled to the base and side walls to extend along the ends 11,11 of the base, and along the opposite angular sides of the side walls 13,13. Said plates may be secured to said side walls by screws or other suitable securing means (now shown) and may also be cemented and sealed to said side walls and base by a suitable sealing cement to form a liquid-tight chamber. A filler opening (not shown) may be provided between the adjacent ends of the plates 12,12, to accommodate the prism to be filled with a clear optical liquid to substantially completely fill the prism, with only enough space left to allow for expansion and contraction of the liquid due to temperature changes. The closure member 17 may then be sealed to the horizontal surfaces 16,16 of the plates 12,12, and suitably secured thereto, to attain a liquid-tight filled prism.

If desired, the closure plate 17 may be removable to accommodate a change of liquid where required, and may be sealed to the plates 12,12 by a suitable gasket or other sealing means, in place of a liquid-tight cement.

As previously mentioned, the optical liquid contained in the prism may be a clear distilled water, and where the prism is used in the optical train for a rear view vision device for an automotive vehicle the liquid may be distilled water with a clear anti-freeze added. The anti-freeze may be alcohol or any other of the well-known anti-freezes which will not settle out of the water and will remain clear over a wide range of temperature changes, preferably from −30° to +100° F.

The transparent refracting plates preferably are at angles of between 30° to 45° dependent upon the shape of the housing for the prism.

In FIGS. 3 through 6 of the drawings, I have diagrammatically shown several forms of rear view vision optical trains in which the dove prism of the present invention may be employed to advantage. In FIG. 3, a housing 21 is diagrammatically shown as extending along the top of an automotive vehicle and as having an opening 22 containing a lens 23, shown as being a cylindrical lens and inverting the image passing therethrough. Within the housing 21 in optical alignment with the lens 23 is a dove prism 24 constructed in accordance with the principles of the present invention. The dove prism 24 is shown as being mounted on its base on a triangular block 25 suitably mounted on and depending from an interior wall of the housing 21. A concave mirror 26 is mounted within the housing 21 adjacent the forward end thereof, and extends within the passenger compartment of the vehicle and is viewable from the passenger compartment through an opening 27 in the top of the vehicle. The arrows in FIG. 3 indicate the position of the image picked up by the lens 23 and inverted by the cylindrical lens 23 as indicated by reference character A, the image is then refracted by an inclined transparent refractory plate of the dove prism and reflected onto the mirror of the dove prism. The dove prism then inverts the image so it is viewed in the proper upright position as it leaves the prism, as indicated by reference character B. The concave mirror 26 then reflects the image to the passenger compartment of the vehicle, where it is still in an upright position, as indicated by reference character C. The prism 24 in the present instance is wide enough to refract and reflect an entire image over a range of approximately 180°, to enable the operator of the vehicle to have a full range of vision to the rear of the vehicle.

In FIG. 4, I have shown a dove prism constructed in accordance with the principles of the present invention, utilized in an aircraft to enable the pilot of the craft to have a clear vision of the area ahead and beneath the pilot's cockpit in a manner somewhat similar to that shown and described in my U.S. Pat. No. 3,165,573, dated Jan. 12, 1965.

In this form of optical train, a lens 29 focuses an image on a mirror 30 which in turn reflects the image and focuses it onto an inclined transparent refractory plate of a dove prism 31. The image is then focused from the outgoing refractory plate of the dove prism onto a mirror 32 in clear view of the pilot.

In this use of the dove prism, the prism rectifies the image inverted by the lens 29 and transmits the image to the mirror 32 in an upright form. The image may, of course, be viewed through a ground glass screen, where it is desirable that the image be clarified and intensified and it is desired to decrease reflections from extraneous light to a minimum.

Figure 6:
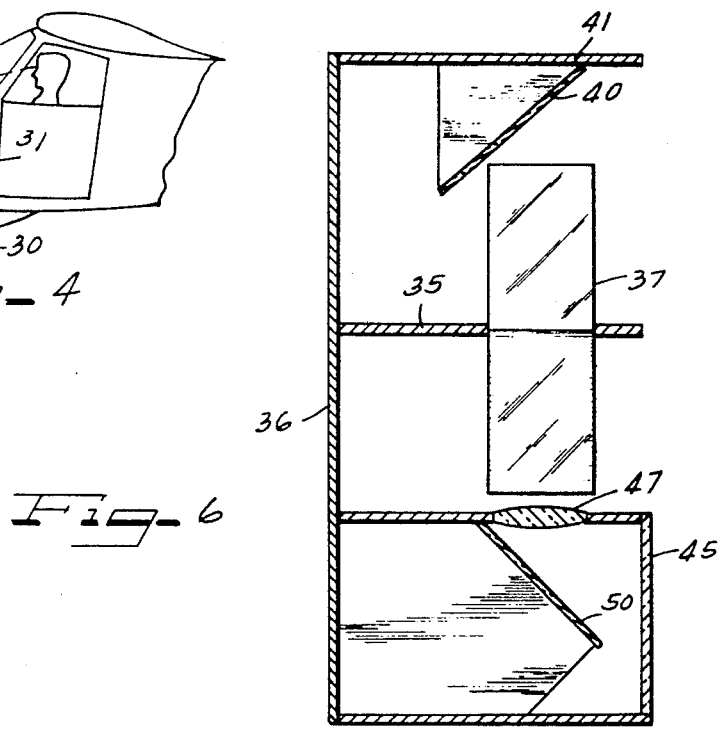
FIG. 6 is a transverse sectional view taken substantially along line VI—VI of FIG. 5.
Figure 5:
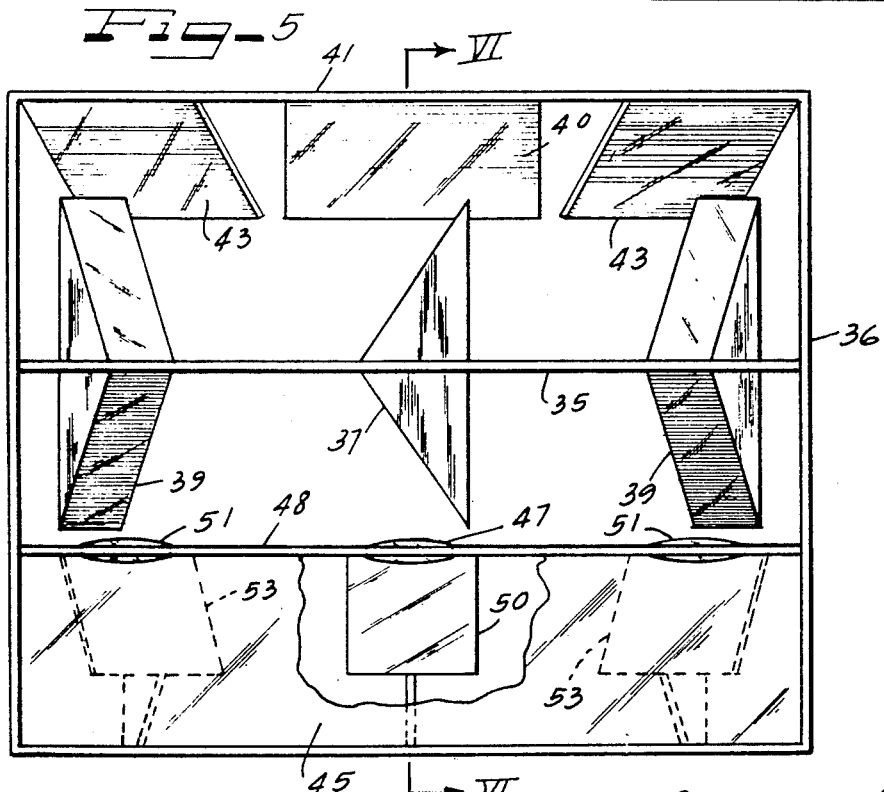
FIG. 5 is a diagrammatic view, schematically showing a rear view vision device for transmitting a total image encompassing an arc of more than 180°, and illustrating three dove prisms in three separate optical trains, for transmitting total lapping and merging images onto a common screen.

FIGS. 5 and 6 show still other optical trains in which a plurality of dove prisms may be used to transmit independent images from the rear of the vehicle to the driver of the vehicle, to cover a wider range than the forms of image transmitters shown in FIGS. 3 and 4. In this form of rear view image pickup and transmitter, three dove prisms, like the prism shown in FIGS. 1 and 2 are suitably supported on a bracket 35 within a housing 36 for the viewing device. A center prism 37 is suitably mounted on the bracket 35 with its base extending vertically and with its sides extending perpendicular to the line of travel of the vehicle and extending equal distances upwardly and downwardly of said bracket. Outer prisms 39 are suitably mounted on the bracket 35 on opposite sides of the prism 37, with their bases extending vertically, and inclined relative to the direction of travel of the vehicle, to in effect toe in the outer prisms relative to the inner prism, at equal angles and toward the inner prism 37. The three prisms are in horizontal alignment with the outer prisms facing inwardly. A mirror 40 is supported above the prism 37 on a top 41 of the housing 36 and is inclined in a forward direction from its top to its bottom relative to travel of the vehicle, to reflect an image from the rear of the vehicle onto a refractory surface of the dove prism 37. Two outer mirrors 43 are mounted on the inside of the housing 36 on the top thereof and are pitched outwardly with respect to the center mirror 40 in opposite directions relative to said mirror, to reflect images from each side of the vehicle and transmit the images to the refractory faces of the dove prisms 39,39. The mirrors 43 are disposed rearwardly of the mirror 40 and are toed outwardly relative to the direction of travel of the vehicle, from the rear to the forward ends of said mirrors to reflect and transmit images from the rear end to each side of the vehicle, onto the associated dove prisms 39. With the arrangement shown, there will be some overlapping of images transmitted, but the final images will be registered with each other in aligned relation relative to each other on a screen 45 inside the vehicle, and in position to be conveniently viewed by the operator of the vehicle. The screen 45 may be made from a sheet of ground glass or a sheet of ground glass having a suitable coating applied to the ground side of the screen, to increase the brightness and clarity of the screen image.

The dove prism 37 transmits an image to a lens 47, disposed therebeneath and carried in a bracket member or shelf 48 in the housing 36. The lens 46 serves to invert and project the image picked up by the mirror 40 to a mirror 50 in front of the screen 45. In a like manner lenses 51,51 are mounted in the bracket or shelf 48 beneath the respective dove prisms 39,39 into position to project images onto mirrors 53,53, mounted in the housing 39, and inclined upwardly and extending in the same general vertical planes as the dove prisms 39,39. The mirrors 53,53 will thus reflect a righted image onto the screen 45. With the arrangement shown, there will be an overlapping of the images reflected by the mirrors 53,53 onto the image reflected by the mirror 50. The prisms 37 and 39,39 are aligned in the same horizontal planes as are the mirrors 40 and 43,43 and the mirrors 50 and 53,53 with the result that the images will all blend into each other and cover an area to the rear of the vehicle of substantially 270°, resulting in the complete elimination of blind spots and a clear view to the rear and sides of the vehicle, to enable the driver to readily determine when a car is passing to one side or the other, without necessitating the turning of the head or eyes from a normal front viewing position.

It should be apparent from the foregoing illustrative showings of dove prisms for rear view vision devices for automotive vehicles and front view vision devices for aircraft, that in such devices the viewing screen or mirror may be positioned to permit the driver to have a clear view of the screen without turning his head from the straight-ahead position, and that in the illustrative form of rear view vision device of FIGS. 5 and 6, the reflecting mirrors 40 and 43 may be disposed above the top of the vehicle while the dove prisms 37 and 39 may be disposed either within or above the top of the vehicle with the viewing screen 45 within the vehicle in position to be clearly viewed by the operator of the vehicle and present a complete rear and side view of the roadway at a glance.

I claim as my invention:

1. A dove prism particularly adapted for optical trains for rear view vision devices for automotive vehicles and the like, comprising:
   a prismatic frame structure including a base,
   parallel spaced side walls extending upwardly from opposite sides of said base and sealed thereto and being in the general form of isosceles triangles having bases extending along the bottom of said base and having angular sides, a mirror extending along said base between said side walls and forming a reflective surface, transparent plates extending along the angular sides of said side walls and abutting opposite ends of said mirror and sealed to said base and side walls, and forming refractive surfaces, extending at equal angles with respect to the reflective surface of said mirror, and a transparent optical liquid contained within said prism between said base, side plates and refractive walls and sealed thereto.

2. The dove prism of claim 1, wherein the side walls are opaque and the angles of inclination of said transparent plates relative to said mirror are in the range of between 30° and 45°.

3. A dove prism in accordance with claim 1, wherein the side walls are opaque, and wherein a closure member extends along the tops of said transparent plates and side walls and is sealed thereto.

4. The dove prism of claim 1, wherein the transparent plates are made from a clear glass.

5. The dove prism of claim 1, wherein the transparent plates are made from a clear transparent plastic.

6. The dove prism of claim 1, wherein the optical liquid includes an anti-freeze which will remain in liquid form and clear throughout a temperature range of between −30° to +120° F.

7. The dove prism of claim 2, wherein the transparent plates are made from a clear glass, and wherein the optical liquid is distilled water and alcohol.

8. In a rear view optical train and in combination with a vehicle having a driver's compartment, a housing having a portion open to the rear of the vehicle and having another portion opening into the vehicle in position to be viewed from the driver's compartment, at least one dove prism in the line of vision of the portion of said housing open to the rear of the vehicle and having equal length refractory plates and a mirror forming a reflective surface and extending along the base of the prism between said plates, said prism forming a total image transmitter, inverter and vertical rectifier, and a mirror spaced from said prism in the optical line of transmission of the prism, reflecting the image for viewing within the vehicle wherein the base of the dove prism extends vertically and the sides of the dove prism are perpendicular to the line of travel of the vehicle, wherein a mirror is in registry with the portion of said housing opening to the rear of the vehicle, wherein a lens inverts the image transmitted by said dove prism, and wherein the reflective mirror in the optical path of the lens transmits the image for viewing by the operator of the vehicle.

9. The rear view optical train of claim 8, wherein the dove prism is mounted on its base within the housing and wherein the prism contains an optical liquid cooperating with said plates.

10. The rear view optical train of claim 9, wherein the inverter lens is disposed in the portion of said housing opening to the rear of the vehicle, and wherein the reflective mirror is a concave mirror inclined relative to the prism to be readily viewed by the driver in the driver's compartment of the vehicle.

11. The rear view optical train of claim 8, wherein dove prisms are disposed on opposite sides of said first mentioned dove prism and have vertically extending bases and are toed inwardly toward said first mentioned dove prism, wherein mirrors are disposed above said dove prisms and are inclined to reflect images from the rear and to the sides of the vehicle and project the images onto the dove prisms, wherein inverting lenses are in the optical paths of transmission of the dove prisms, wherein reflective mirrors are disposed beneath each of said lenses and inclined upwardly and inwardly toward the center of said housing, and wherein a screen readily viewable by the operator of the vehicle extends across said mirrors and merges the images reflected thereby.

* * * * *